INVENTORS
SEYMOUR PRICEMAN
LAWRENCE SAMA
BY Cyril A. Krenzer
ATTORNEY

INVENTORS.
SEYMOUR PRICEMAN
LAWRENCE SAMA
BY
Cyril A. Krenzer
ATTORNEY

# United States Patent Office 3,540,863
Patented Nov. 17, 1970

3,540,863
ART OF PROTECTIVELY METAL COATING COLUMBIUM AND COLUMBIUM - ALLOY STRUCTURES
Seymour Priceman and Lawrence Sama, Seaford, N.Y., assignors to Sylvania Electric Products Inc., a corporation of Delaware
Filed Jan. 22, 1968, Ser. No. 699,534
Int. Cl. C22c 39/44; C23c 17/00
U.S. Cl. 29—191.2       17 Claims

ABSTRACT OF THE DISCLOSURE

Structures of Cb or Cb alloys are improved in their properties, especially in resistance to high-temperature, low-pressure oxidizing environments, by forming on exposed surfaces thereof a fused slurry coating or skin of a Si-Cr-Fe complex that is, for example, from about 1 to 6 mils thick.

The coating is applied initially in, for instance, the form of a composition comprised of the aforementioned metals, in powder (−325 mesh) form, suspended in a fugitive organic binder (e.g., nitrocellulose) dissolved in an organic solvent (e.g., amyl acetate). The powdered metals are present initially in the coating composition in the following approximate weight percentages:

| | |
|---|---|
| Si | 60–85 |
| Cr | 10–40 |
| Fe | 5–40 |

The wet-coated, Cb-metal (preferably Cb-alloy) metal body is dried and then fired under non-oxidizing conditions (e.g., under vacuum or in an inert atmosphere, or using a combination of both such means) at a temperature and for a period of time sufficient to fuse the aforesaid metal components of the applied coating. The fused coating becomes an integral part of the Cb-metal substrate as is illustrated in FIG. 1.

The articles of the invention are useful, for example, as part of a space re-entry vehicle such as a nose cone; and in the fabrication of hypersonic aircraft.

BACKGROUND OF THE INVENTION

This invention relates broadly to the art of protectively coating structures or bodies comprised or consisting essentially of columbium or columbium alloys. More particularly it is concerned with the formation on such structures of a fused slurry coating or skin of a Si-Cr-Fe complex whereby the useful properties of the structure are materially improved, e.g., by imparting thereto improved resistance to high-temperature, low-pressure, oxidizing environments.

Columbium is a refractory metal that has very desirable characteristics for many purposes including a high resistance to chemical attack, especially acids. However, when subjected to high temperatures care must be taken to avoid the absorption of gases. Furthermore, when columbium is heated under normal atmospheric conditions or in other gases, it results in embrittlement of the metal. These difficulties have been obviated to some extent by forming alloys of columbium with other metals, e.g., tungsten, molybdenum, vanadium, titanium, zirconium, nickel and iron and wherein the columbium normally is in predominant amount (see, for example, U.S. Pat. No. 3,317,314—Wlodek et al., dated May 2, 1967).

Metal coatings or films heretofore developed for the oxidation protection of refractory metals (including columbium) have usually been of three general types.

One type is essentially an intermetallic compound of the base metal with either Si, Al or Be slightly modified by the addition of such other metals as, for example, Cr, B, Ti or Mn; or with Al or Si when the metal used to form an intermetallic compound with the base metal is other than Al (i.e., Si or Be) or other than Si (i.e., Al or Be). Such coatings are formed on the refractory metal substrate by hot dipping or single-cycle pack cementation processes. When such techniques are used, the amount of alloying component or components that become a part of the final coating is dependent upon such influencing factors as, for example, reaction rates, solubilities, volatilities, thermal stabilities and diffusion rates of the individual metal components, as well as upon other thermodynamic considerations involved therein. Consequently, with such processes the amount of alloying material incorporated into the final coating usually cannot be readily predicted (if at all), nor can alloy formation be controlled beyond very narrow limits. Furthermore, certain alloying elements that might be expected to be beneficial in the proper amount either cannot be introduced into the final coating at all or in a quantity sufficient to have any practical effect.

A second type of metal coating for refractory metals is produced by a multicycle pack cementation process in which a silicide modifier (e.g., Cr, Ti, B, Mo, W) is applied separately in the first cycle to the refractory metal substrate, and silicon is applied to the modified substrate surface and reacted separately therewith in the second cycle. By this second method of forming metal coatings on refractory metal substrates, as with the first method described above, the specific alloying elements and quantities thereof that can be incorporated into the final coating are severely limited by thermodynamic and kinetic considerations.

Hot-dipped coatings of the first type are not considered too practical, especially for the coating of large parts. This is because of the high reactivity of molten coating alloys; the equipment difficulties inherent in maintaining large quantities of molten metal at relatively high temperatures (1600°–2000° F.); the necessity to avoid the entrapment of air in crevices or small openings when the part is being immersed in the molten metal; the relatively high cost of the large quantities of coating materials required; and the high cost in equipment, material and time associated with the subsequently required diffusion treatment that is necessary in order to convert the unreacted low-melting outer layer of the coating to the refractory, oxidation-resistant intermetallic compound.

Both the single-cycle and the multicycle pack cementation processes hereinbefore described have in common a number of disadvantages in adition to those previously mentioned with respect to the lack of control of the composition over a broad range. Such disadvantages include the cost of applying the coating due to the large quantities of expensive coating materials required; the inability to coat large parts uniformly (both with respect to composition and thickness), due to the insulating properties of the massive powder packs; and the danger of damaging large, expensive and fragile refractory alloy sheet structures due to the shifting of the large masses of coating materials; and also, the increased danger of contaminating such large parts by contact with the necessary halide salt activators or by failure of the atmosphere control system during the one or more long heat-treating cycles that are required.

A third type of coating technique that has been developed for the oxidation-protection of refractory metals can be classed as slurry coatings of the so-called "diluent" type. Probably the best known and most commonly used coatings of this type are the Sn-Al and the Ag-Si coatings. These coatings consist of intermediate layers of aluminide (when the outermost covering is Sn-Al) or silicide (when Ag-Si is the outermost covering) adjacent to the refractory metal substrate, and over which is a covering layer of Sn-Al or Ag-Si alloy on the respective aluminide and silicide.

Coatings of this third type are applied by spraying a mixture of the elemental powders suspended in lacquer on the cleaned refractory metal surface to be coated; and, typically, then firing the air-dried Sn-Al coating in vacuum at 1900° F. for ½ hour or the Ag-Si coating in argon at 2370° F. for ½ hour. A repeat cycle is usually necessary in order to develop the full protective potential of these coatings.

Although obviating most of the processing disadvantages inherent in the hot dip and pack cementation processes, these "diluent" slurry coatings also have numerous drawbacks. For example, they have a tendency to run off the coated substrate during the required heat treatment. This results in a thicker coating toward the bottom of the part and a thinner, less protective coating at and near the top of the part. Since both Sn and Ag are relatively dense and must constitute a major proportion of the coating in order to result in a reasonable melting temperature, the coatings are necessarily very heavy. This is, of course, extremely disadvantageous in many applications such as those in, for example, the aerospace industry.

Another serious disadvantage of "diluent" metal slurry coatings on refractory-metal substrates is that they are not geometrically stable during use in high-temperature oxidizing environments, as evidenced by the fact that the surfaces become very irregular and wrinkled. Furthermore, when substrates coated by this technique are used at elevated temperature, the coatings contain liquid phases and, therefore, are less resistant to erosion by high-velocity gases as compared with coatings that do not contain liquid phases under such conditions. Also, Sn and Ag (the only diluent metals that have thus far been found to be suitable in this type of coating) have fairly high vapor pressures at temperatures above 2000° F. Hence, if such coatings are used in environments combining high temperatures and low ambient pressures, the coatings will evaporate at very high rates and their protectiveness will thus be impaired or destroyed. For instance, Sn-Al and Ag-Si coatings on refractory metal substrates are substantially completely destroyed by exposure to a temperature of 2500° F. for 1 hour at a pressure of 0.1 torr (0.1 mm. Hg). Since low-pressure, high-temperature environments are encountered in earth re-entry systems, the high volatility of coatings of this type severely restricts their use in such applications.

Still another disadvantage involved in the use of "diluent" metal slurry coatings accrues from the fundamental principles on which such coatings are based, and will be immediately apparent to those skilled in the art from the following brief discussion.

Theoretically there are many different kinds of elements and compounds that might be incorporated in "diluent" type metal coatings and which could not be done when using hot dipping or pack cementation processes. However, there is little or no control over the form in which such modifiers will be present in a "diluent" type final coating, nor has there been any indication that such additions do, in fact, enhance the protective mechanisms of such coatings. This is because most of the metals that might be employed as modifiers react very strongly with aluminum or silicon. Hence they are present in the final coating as solid "islands" of intermetallic compound in a matrix of Sn-Al or Ag-Si alloy. Since the protective action of "diluent" coatings is due to the formation of a film of silica or alumina on top of the matrix alloy, modifiers that are not in solution in these matrix alloys are unlikely to materially enhance the protective properties of these coatings.

OBJECTS AND SUMMARY OF THE INVENTION

It is a primary object of the present invention to provide a protectively surface-coated substrate of columbium or a columbium alloy, more particularly a shaped article of such a material (preferably a Cb alloy), that is resistant to oxidation at high temperatures (e.g., up to 2500° F. and higher) and under atmospheric, superatmospheric and subatmospheric pressures, the latter ranging from just above 0 torr up to atmospheric pressure.

Another object of the invention is to provide a method of making the protectively surface-coated substrates briefly described in the preceding paragraph.

Other objects of the invention will be apparent to those skilled in the art from the following more detailed description and from the appended claims. For purpose of brevity the expressions "columbium metal" or "Cb metal" are sometimes used generically herein to include both elementary Cb and alloys of Cb.

The objects of the invention are attained by providing a substrate or part formed of columbium or a columbium alloy, preferably a Cb alloy, and more particularly such an alloy wherein columbium constitutes at least 45 weight percent, with a coating (e.g., a skin or film) resulting from the application to the cleaned, metal substrate of a suitable vehicle (e.g., a nitro-cellulose lacquer) in which is suspended powdered metal (in elementary or alloy form) having the following overall composition in approximate percent by weight:

| | Approximate percent by weight |
|---|---|
| Silicon | 40–85 |
| Chromium | 10–40 |
| Iron | 5–40 |

The slurry of powdered metal is applied to the cleaned substrate by any suitable means, e.g., by spraying, and after air-drying, the substrate with its air-dried or "green" coating thereon is fired at a temperature slightly above its melting point (e.g. at about 2500° F.) under non-oxidizing (substantially non-oxidizing) conditions for a short period of time, for instance up to about 1 hour. This process of coating may be defined as a "fused slurry" coating system, and the coating or skin that is formed on the substrate or part of Cb or Cb alloy may be designated a "fused slurry" silicide coating. Further details of the process and of the constitution of the film that is formed will be given later herein.

DESCRIPTION OF THE PREFERRED EMBODIMENTS

Figure 1:
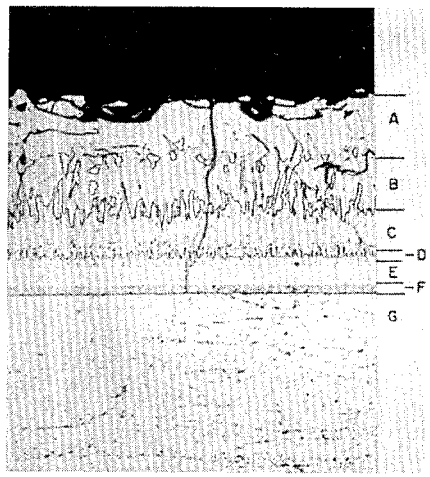
FIG. 1 is a reproduction of a photomicrograph (300×) showing the morphology of a Si-20Cr-20Fe (i.e., 60% Si, 20% Cr and 20% Fe, by weight, in the metal component of the slurry, fused silicide coating on a columbium alloy (D-43)
Figure 2:
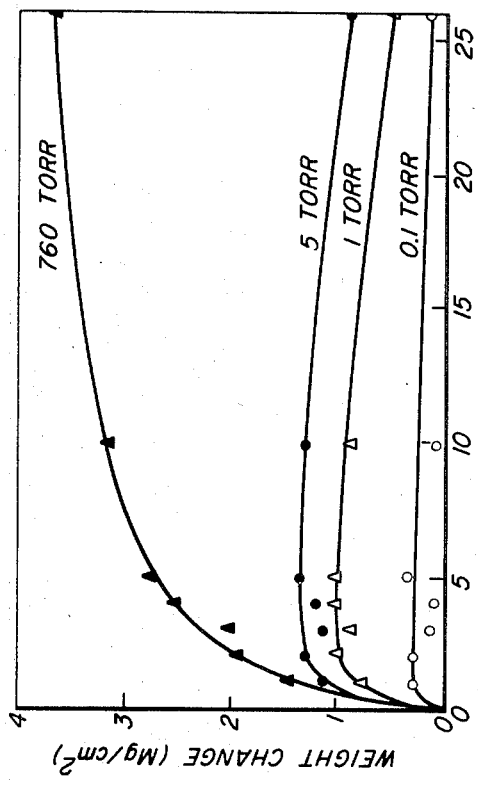
FIGS. 2 and 3 are graphs showing the weight change versus time, at 2500° F. and various atmospheric pressures, of individual Si-20Cr-20Fe coatings on two different columbium alloys.
Figure 3:
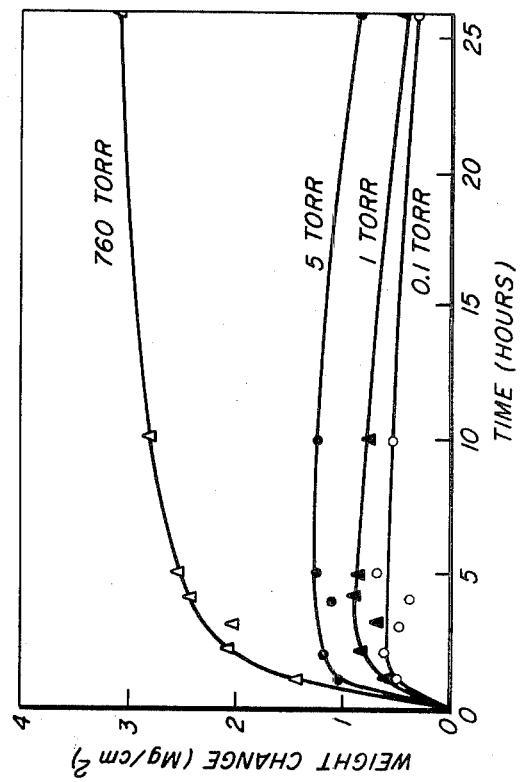

The novel features that are characteristic of the invention are set forth in the appended claims. The invention will best be understood from the following more detailed description, especially when considered in connection with the above-described drawings.

THE COLUMBIUM ALLOY

As previously has been mentioned, the columbium metal substrate is preferably a columbium alloy. It can be in the form of for example, a sheet, wire, rod or other shaped or fabricated component. Preferably the alloy is one wherein the columbium constitutes at least 45%, more preferably a major percentage, by weight thereof.

In one class of columbium alloys that is adapted to be surface-coated in accordance with this invention, the alloy consists essentially of, by weight:

(a) at least 45% Cb,
(b) from 6 to 50% W,
(c) up to about 15% Zr,
(d) up to about 20% Ti,
(e) up to about 5% Mo,
(f) up to about 5% V,
(g) up to about 5% Fe,
(h) up to about 5% Ni,
(i) up to about 5% Co,
(j) up to about 5% Ta,
(k) up to about 10% Hf,
(l) up to about 1% each of Ba, Y, Be and the rare-earth metals,
(m) up to 1% carbon,
(n) up to 0.75% oxygen, and
(o) up to 0.5% nitrogen, the sum of the said carbon, oxygen and nitrogen not exceeding 1.5%.

Other limitations on the foregoing weight percentage proportions are as follows:

(1) The zirconium (Zr) is present in a minimum amount of at least 0.25% when the titanium (Ti) content of the alloy is less than 1%.

(2) The Ti content of the alloy is at least 1% when the Zr content is less than 0.25%.

(3) The sum of the percentages of molybdenum (Mo) plus vanadium (V) does not exceed 7%.

(4) The sum of the iron (Fe), nickel (Ni) and cobalt (Co) does not exceed 10%.

(5) The sum of the tantalum (Ta), hafnium (Hf), barium (Ba), yttrium (Y), beryllium (Be) and the rare-earth metals does not exceed 10%.

Beneficial effects with respect to particular properties are attained when the tungsten-titanium weight percentages are within the ranges of 5–20% Ti and 15–35% W; and the tungsten-zirconium weight percentages are within the range of 0.5–15% Zr and in excess of 10% W, the higher Zr weight percentages being preferred when Ti is present. Maximum ease of fabrication is secured at the higher titanium levels and with tungsten contents of less than 25 weight percent and zirconium contents less than 10 weight percent.

In a more satisfactory subclass of columbium alloys, within the aforementioned broader class, that can be surface-coated by the method of this invention, the alloy consists essentially of, by weight:

(a') at least 45% Cb,
(b') from 10 to 40% W,
(c') up to 15% Zr,
(d') up to 17% Ti, the Zr being present in a minimum amount of 0.5% when the Ti content is below 3%, and the Ti being present in a minimum amount of 0.5% when the Zr content is less than 0.5%,
(e') up to 4% Mo,
(f') up to 4% V, the sum of the percentages of Mo and V not exceeding 7%,
(g') up to 5% Ta,
(h') up to 10% Hf,
(i') up to 0.5% of Ba, Y, Be and the rare-earth metals, the sum of the components of (g'), (h') and (i') not exceeding 10%,
(j') up to 3% each of Fe, Ni and Co, the sum of said Fe, Ni and Co not exceeding 5%,
(k') up to 1% carbon,
(l') up to 0.5% oxygen,
(m') up to 0.3% nitrogen, the sum of said carbon, oxygen and nitrogen not exceeding 1%.

Formulations of columbium alloys within the above-described subclass that have markedly superior properties and that are advantageously surface-coated by the method of this invention in order to improve their high-temperature oxidation resistance include those given below. All percentages are by weight.

(A)

| | Percent |
|---|---|
| Tungsten | 10–30 |
| Titanium | 5–15 |
| Zirconium | 3–10 |
| Columbium | [1] Balance |

(B)

| | |
|---|---|
| Tungsten | 15–35 |
| Titanium | 5–15 |
| Zirconium | 0.5–3.0 |
| Molybdenum and vanadium (total) | 1–3 |
| Columbium | [1] Balance |

(C)

| | |
|---|---|
| Tungsten | 15–30 |
| Titanium | 5–10 |
| Zirconium | 0.5–3.0 |
| Molybdenum and vanadium (total) | 1–3 |
| Iron | 1–3 |
| Nickel | 0.5–1.5 |
| Columbium | [1] Balance |

(D)

| | |
|---|---|
| Tungsten | 10–30 |
| Titanium | 5–8 |
| Zirconium | 1–3 |
| Columbium | [1] Balance |

[1] Includes incidental impurities since commercially available metals containing incidental impurities are used in preparing the alloys.

More specific examples of columbium alloys embraced by the above-described formulations, and which are useful as substrates in practicing this invention, are given in Examples I through XIV and in Table I of the aforementioned U.S. Pat No. 3,317,314 to Wlodek et al. These examples and tabulated formulations include columbium alloy compositions wherein the weight percent of columbium ranges from a minimum of 57% of to a maximum of about 85% (actually 84.9%).

OTHER EXAMPLES OF COLUMBIUM ALLOYS

Still other examples of columbium base alloys that can be made into various articles of manufacture, e.g., gas-turbine blades and other components, rocket nozzles, reentry nose cones of spacecraft, and numerous other articles of manufacture, especially those shaped bodies or structures that are subjected (or likely to be subjected) to high-temperature oxidation condition for a relatively short period of time, and which can be protectively surface-coated in accordance with this invention to enhance their utility in the particular service application, are given below. In these formulations the percentage proportions are by weight and are approximate (unless otherwise specified or indicated), since they are based on the charge. In stating in the formulation that the "balance" is columbium, it is to be understood that this expression also includes incidental impurities that may be present in the alloy composition due to the fact that commercial-grade metals were used in their preparation.

(1) 99% Cb and 1% Zr. (May be used when permitted by the strength requirements of the structure.)
(2) 10% W, 1% Zr, 0.1% C, and the balance Cb (results of analysis of ingot sample of D–43).
(3) 10% W, 2.5% Zr, and the balance Cb (results of analysis of ingot sample of Cb–752).
(4) 28% W, 2% Hf, ca. 0.07% C, and the balance Cb (B–88).
(5) 20% Ta, 10% W, 5% Mo, 1% Zr, 0.1–0.2% C, and the balance Cb (Cb–132).

(6) 10% Ti, 10% Mo, and the balance Cb (D–31).
(7) 28% Ti, 10% Al, and the balance Cb (451).
(8) 42% Ti, 9% Al, and the balance Cb (617).
(9) 25% Ti, 10% Cr, and the balance Cb (638).
(10) 5% Mo, 5% V, 1% Zr, and the balance Cb (B–66).
(11) 11% W, 3% Mo, 2% Hf, 0.08% C, and the balance Cb (Su–16).
(12) 20% W, 1% Zr, 0.09% C, and the balance Cb (As–30).
(13) 10% Hf and the balance Cb (C–103).

In the foregoing list of columbium alloys that are useful in practicing the present invention, the manufacturer's designation for the particular Cb alloy is given in parenthesis at the end of the formulation for all but the first alloy.

It is not essential that the body or structure that is protectively coated in practicing this invention be wholly constructed or fabricated of alloy Cb or of the same Cb. For example, the columbium metal may be cladded upon another metal such as, for example, Mo, Ta and W; alloys of any two or three of these metals with each other; and alloys of Mo, Ta or W with a different metal or metals. Or it may be cladded upon a different columbium alloy. The exposed surface of columbium metal is then provided with a fused metal coating or skin of the kind with which this invention is concerned.

COATING PROCEDURES

The silicon, chromium and iron, or alloys of any two or all of them in any proportions, if not initially in the form of finely divided powders, are pulverized to form such powders. The particle sizes or ranges of particle sizes may be those that are commonly employed in powder metallurgy techniques, and are at least such that all will pass through a 325-mesh screen (U.S. Standard Sieve Series).

The elemental or prealloyed powders are thoroughly mixed together in a suitable blender or mixing device (e.g., a V-blender) until a substantially homogeneous composition has been obtained. The overall relative proportions of the components (irrespective of whether they are in elemental or alloyed form) is as follows:

| | Percent by weight |
|---|---|
| Chromium | ca. 10–30 |
| Iron | ca. 5–30 |
| Silicon | [1] Balance |

[1] This includes incidental impurities since commercial-grade metals are employed.

A more preferred range of proportions is as follows:

| | Percent by weight |
|---|---|
| Chromium | 10–20 |
| Iron | 5–20 |
| Silicon | [1] Balance |

[1] Same as prior footnote.

The powdered metal is converted into a liquid coating composition, adapted for application (e.g., by dipping, brushing, spraying or the like) to the columbuim-metal substrate or part, by suspending it in a suitable vehicle, e.g., a solvent solution of a natural or synthetic, thermoplastic, temporary or fugitive binder. The use of thermosetting binders is not precluded; but generally they are likely to be less satisfactory because of the greater difficulty in removing all of the carbonaceous residue during subsequent fusion treatment of the coated part.

Examples of binders that may be employed are solvent solutions or dispersions of the various available synthetic polymers, among which may be mentioned polyacrylamide, polyvinyl acetate and the homopolymers and copolymers of the lower alkyl (e.g., $C_1$ through $C_5$) acrylates with each other and with other compounds containing a monoethylenically unsaturated grouping. We prefer to employ an ordinary nitrocellulose (pyroxylin) lacquer wherein the solvent is, for example, amylacetate.

The concentration of the powdered metal in the vehicle and the amount of solvent in the same are varied as desired or as may be required, depending upon such factors as, for instance, the particular method of applying the coating (brushing, spraying or dipping), the desired thickness of the individual coating, the number of coatings to be applied, the viscosity of the vehicle, the desired covering power of the coating composition, and other influencing factors. Typically, the metal powder is present in the coating composition (i.e., powder plus vehicle) in an amount corresponding to from 500 to 1600 grams per 1000 ml. of the liquid composition.

The powders are mixed with the vehicle by mechanical stirring. Mixers of the type employed in mixing paints can be used for this purpose. Mixing is continued at any suitable temperature for a time sufficient to provide a substantially homogeneous composition.

The coating is applied to the cleaned surface of the columbium-metal substrate. The surface of the part may be cleaned by dry, abrasive blasting with iron or aluminum oxide grit, or by acid pickling for 1 minute in a solution of 1 part concentrated Hf, 1 part concentrated $HNO_3$ and 1 part water. There is no preferred cleaning method insofar as wetability or protectiveness of the coating is concerned. Hence the selected method depends primarily upon such other factors as, for instance, convenience, availability of suitable equipment, and accessibility of the surface to be coated. If all surfaces are readily accessible, spraying is the preferred method of application.

The applied coating on the columbium-metal part is then air-dried. The air-dried coating or skin will vary in weight with the amount of the initially-applied wet coating, but usually will be within the range of from 15 to 30 mg./cm.[2] Heavier coatings can be obtained, if desired, either by applying a thicker wet layer of the coating composition initially, or by applying one or more fresh layers over the air-dried coating followed by air-drying after each successive application of the liquid coating material. One of the particular advantages of the present invention is that normally only one coating layer is necessary.

After air-drying, the coated part is placed either on suitable heat-resistant pads, e.g., quartz or alumina pads, or is suspended by tantalum wires in a cold-wall vacuum furnace and fired at a temperature which is near, at or slightly above the melting point of the "as-applied" coating composition, but which is preferably slightly above said melting point. In such a furnace, the coated part is supported or suspended inside the heating element wherein it is heated by radiation, and is therefore quickly heated to a uniform temperature.

The time and temperature of firing the coated part in all cases are sufficient to effect fusion of the applied coating. Generally, this heat or diffusion-treatment is from ¼ to 2 hours at a temperature of from about 2400° to about 2600° F. under non-oxidizing (substantially non-oxidizing) conditions. Thus, this heat-treatment can be carried out in an atmosphere of an inert gas, e.g., helium, argon, krypton, xenon or other members of Group O of the Periodic Table of the Elements. Advantageously the non-oxidizing conditions for the heat treatment are obtained by heating the coated part under a high vacuum, e.g., at less than 0.001 torr, and preferably at less than 0.0001 torr. The temperature and time of treatment depend upon such influencing factors as, for example, particular coating composition and substrate employed. A one hour heat-treatment at about 2500° F. at a pressure of less than 0.001 torr has been used most often with satisfactory results.

If desired, heating can be carried out initially under partial vacuum and completed in an atmosphere of an inert gas.

Any furnace capable of attaining the required temperature and pressure values in firing the coated structure without oxidation thereof, e.g., by firing it under high vacuum or in an atmosphere of inert gas, can be employed.

The thickness of the fused coating or skin may range, for example, from about 1 mil to about 6 mils, but usually is within the range of from about 2½ mils to about 4 mils. The unit increase in weight of the finished, fused coating metal may range for instance, from about 6 to about 40 mg./cm.$^2$, more particularly from 15 to 25 mg./cm.$^2$.

Generally a fused coating of the desired thickness is obtained from the application of only a single layer of the liquid coating composition. However, the single fused coating initially formed can be built up to provide a thicker coating, if desired, by repeating the application of the wet coating one or more times, followed each time by air-drying and fusing as has just been described with reference to the application of a single coating.

The coatings applied in practicing this invention have very good wetting properties; and, as previously indicated, only a single application is usually necessary in order to obtain the required thickness and reliable coverage. The wetting properties are such that the coating will also act as a braze where this may be required; and, also, flows or tends to flow into crevices thereby to coat and protect these critical and difficult-to-coat areas.

The metal coatings with which this invention is concerned can be applied selectively to portions of parts or assemblies. Also, modifications of the primary composition (or even basically different compositions if believed to be necessary) can be applied to specific areas of the same part or assembly where experience indicates that different compositions would be more suited to the particular environmental conditions.

The procedure is simpler and less expensive than the prior-art techniques hereinbefore described. In coating parts with dimensions up to, for example, 2 ft. x 2 ft. x 3 ft., only a few pounds of coating material are required when practicing the method of this invention as compared with thousands of pounds required (but not all consumed) for the prior-art hot-dipping and pack-cementation methods. Furthermore, less time (usually, at most, only about 1 hour) is required by the method of this invention whereas all hot-dip and pack-cementation processes necessitate one or more heat-treatments that require from 4 to 16 hours for each single treatment, not including the long heat-up and cool-down cycles.

The coatings with which this invention is concerned are substantially uniform in thickness. This is due mainly to the preferred technique of applying them to the columbium-metal substrate. In this respect they differ markedly from coatings applied by a pack-cementation process wherein the coated part is embedded in an insulating powder pack inside a retort and is heated by conduction. By this technique the parts nearest the walls of the retort are heated up much more rapidly than those at the center; hence, the resulting coatings are not uniform either in composition or in thickness.

Another advantage of the coatings involved in the instant invention, and that accrues both from the composition of the coating and from the preferred technique by which it is applied, is the ease with which patch or repair work can be done in fixing a damaged surface. In making a repair it is only necessary to clean the area where the defect exists or the damage has been done, apply the same coating composition used in forming the original coating, and heat-treat the repaired area or the entire part under vacuum or in an inert atmosphere as heretofore has been described.

From the foregoing description it will be seen that the present invention provides an article of manufacture, e.g., part of a space re-entry vehicle such as a nose cone, comprised of a columbium metal, more particularly a columbium alloy containing at least 45% by weight thereof of Cb. This alloy has a surface which is oxidation-resistant at low and at high temperatures (especially the latter) and under atmospheric, superatmospheric and subatmospheric pressures (especially the latter). This surface (an adhering metal film) is obtained by fusing in situ, in a non-oxidizing atmosphere, specifically under high vacuum or in an inert atmosphere, the powdered metal material in a coating applied to the uncoated surface of the aforesaid alloy. The metal material consists essentially of Si, Cr and Fe in the approximate weight percentages mentioned hereinbefore. A typical nose-cone design is illustrated in FIG. 1 or U.S. Pat. No. 3,318,246, differing from those provided by this invention in that the cone is fabricated of tantalum, niobium, tungsten or alloys predominantly of these metals, and the surface of which is coated with a phosphide of the aforesaid metal formed in situ.

In order that those skilled in the art may better understand how the present invention can be carried into effect, the following examples are given by way of illustration and not by way of limitation. All parts and percentages are by weight unless otherwise specified. All the metal powders employed are technical grades, and all have a particle size of −325 mesh (U.S. Standard Sieve Series).

EXAMPLE 1

Silicon, chromium and iron metal powders are weighed out in the proportion of 60 w/o, Si-20 w/o, Cr-20 w/o Fe, charged into a V-blender, and blended for 2 hours. The blended powder mixture is then added to a lacquer of high-purity, low-residue nitrocelluose in a solution of amyl acetate solvent in the approximate proportion of 1 to 1 by volume, and is thoroughly mixed with a mechanical stirring machine.

The resulting slurry or coating composition is poured into the jar or reservoir of a conventional paint-spray gun. The jar or reservoir of this gun is preferably provided with means for continuous, mechanical stirring of the slurry in order to prevent settling of the metal powders.

In this example the parts coated with the above-described coating composition are 0.012-inch thick, sheet metal specimens of D43 alloy (Cb-10 w/o, W-1 w/o Zr-0.1 w/o, C) previously cleaned by immersion for 30 seconds in a solution of equal proportions of concentrated H$f$, concentrated HNO$_3$, and water followed by a water rinse, and finally by air-drying.

The parts are sprayed with the slurry on both sides using normal paint-spraying techniques. After spraying, the parts are allowed to air-dry for one hour. The air-dried weight of the coating is in the range of 20–25 mg./cm.$^2$.

The air-dried parts are then placed across small ceramic (alundum) combustion boats which, in turn, are placed in a vacuum furnace. The furnace is sealed and pumped to a vacuum of less than 10$^{-4}$ torr at which point heating is begun. The heat is initially applied slowly until at some low temperature (less than 500° F.) it is apparent (evidenced by the sudden increase in pressure within the furnace) that the amyl acetate solvent is volatilizing from the lacquer component of the coating composition. At this point heating is temporarily interrupted until it is observed that the pressure in the furnace is again at a level of 10$^{-4}$ torr or lower. Thereafter, heating is continued to a furnace temperature of 2580° F., held there for one hour after which time the furnace heat is turned off. When the furnace has cooled to a temperature sufficiently low to prevent any damage to the internal parts of the furnace, air is admitted thereto, and the furnace is opened and the parts removed.

The furnace employed in firing the coated specimen parts of this example is a cold-wall, metallic-resistance-element furnace, the heat-up timer being about 10 minutes and the cool-down time about 30 minutes in carrying out the described firing step. In larger vacuum furnaces of similar or different design and/or with larger work loads, longer heat-up and cool-down times are necessary. However, these factors are not critical in the chemistry involved in the firing step nor in the performance characteristics of the finished, coated part.

Instead of firing the air-dried parts under vacuum as above described, they can be fired in an atmosphere of an inert gas including, for example, argon, krypton, helium and xenon, or mixtures thereof. Or, the air-dried parts can be fired initially under partial vacuum and then finished in an atmosphere of an inert gas.

An optical photomicrograph (300×) of a typical coated specimen prepared as described in Example 1 is shown in FIG. 1. X-ray diffraction analysis of the Si-20Cr-20Fe-coated Cb alloy (D-43) showed that the major phase was $MSi_2$ (close to $CbSi_2$) and the secondary phase was $M_5Si_3$ (close to $CbSi_3$) as the secondary phase. No other phases were detected.

Electron microbeam probe (EMP) analyses were made on the coated columbium alloy of which a photomicrograph is shown in FIG. 1. An elementary analyses of five of the seven planes that appear is given in Table I.

The points analyzed appear essentially as single-phased. However, there could be a fine $CbSi_2$ second phase throughout the B and C planes. Plane A is $CbSi_2$ with very little modification. Plane B is apparently $M_5Si_{3hex}$, since this was the secondary phase detected by X-ray diffraction analysis of the surface. It is surprising that this pattern was found to be close to that of $Cb_5Si_3$ in view of the considerable variation in the elementary composition of this phase from that of $Cb_5Si_3$. Planes C and E are probably substantially the same phase as Plane B although their elementary compositions are quite different.

Plane G is the base metal (i.e., columbium alloy D-43). It contains a small amount of Fe in solution, although neither Cr nor Si were present in detectable quantities. Between Planes C and E there is another layer that is practically free of Cr and Fe but has a high content of Cb and Si. This layer was too narrow for analysis. In an analogous situation with a similar coating a corresponding layer was analyzed as $CbSi_2$ containing, by atom percent, 0.2% Fe and 0.8% Cr. Layer F, adjacent to the substrate, also was too narrow to analyze. However, in an identical sample in which this layer was widened by diffusion, the EMP analysis showed the composition to be constituted of, by atom percent, 39.5% Si, 2.3% W, 0.4% Fe, 0.0% Cr and the balance Cb, which analysis corresponds very nearly to that of $Cb_5Si_3$.

TABLE I.—ELEMENTARY COMPOSITION, ATOM PERCENT

| Plane | W | Fe | Cr | Cb | Si |
|---|---|---|---|---|---|
| A | 1.0 | 0.2 | 0.8 | 30.3 | 67.7 |
| B | 0.9 | 13.4 | 19.4 | 20.6 | 45.7 |
| C | 0.6 | 18.3 | 9.8 | 27.4 | 43.9 |
| D | Too narrow to analyze | | | | |
| E | 1.9 | 8.0 | 4.1 | 45.3 | 40.7 |
| F | Too narrow to analyze | | | | |
| G | 4.6 | 0.2 | 0.0 | 95.2 | 0.0 |

EXAMPLE 2

Essentially the same procedure is followed as described under Example 1 with the exception that the substrate is a different columbium alloy, viz, Cb-752 (10% W, 2.5% Zr and the balance Cb).

Table II shows the results of various oxidation and re-entry simulation tests for the coating-substrate combinations of Examples 1 and 2.

TABLE II.—VARIOUS OXIDATION AND RE-ENTRY SIMULATION TEST DATA FOR COATING-SUBSTRATE COMBINATIONS OF EXAMPLES 1 AND 2

| Coating composition | Base alloy | Cyclic oxidation life at 2,800° F. (No. of 1-hour cycles to failure) | Slow cyclic oxidation life at 1 atm. 2,500° F. maximum temperature (No. of 1-hour cycles to failure) | Re-entry simulation life (No. of 1-hour cycles to failure) | | |
|---|---|---|---|---|---|---|
| | | | | 2,500° F. maximum temperature internal surface profiles | 2,500 °F. maximum temperature external surface profiles | 2,600° F. maximum temperature internal surface profiles |
| Si-20Cr-20Fe | D43 | 10(E) | 63(E), 63(E) | 40+, 40+, 200+, 200+ | 40+, 40+, 200+, 200+ | 100-140*, 100-140* |
| Si-20Cr-20Fe | Cb752 | 9(E) | 71(E), 71(E) | 40+, 40+, 200+, 200+ | 40+, 40+, 200+, 200+ | 200+, 169(E)* |

+ Test stopped. Samples not failed.
E Edge failure.
* Specimens contaminated by reaction products of first failed specimen.

The method of conducting the tests mentioned in the column headings of Table II are as follows:

Cyclic oxidation life.—In this test the coated specimens were subjected to 1-hour cycles at 2800° F. followed by 5 minutes at ambient (room) temperature. Lower screening-test temperature also may be used in this test, e.g., 2500°, 2200°, 1800° and/or 1400° F.

In carrying out the test the sample is placed in a quartz boat which is manually inserted in a furnace that is maintained at the test temperature. After each 1-hour period the boat is withdrawn from the furnace and air-cooled. The criterion for failure is the observance with the unaided eye of oxidation of the base metal at any point on the specimen.

Slow cyclic oxidation test.—This test is believed to be much more meaningful than the cyclic oxidation test previously described. It consists in heating and cooling the coated specimens slowly through a broad temperature profile.

The test is carried out in a vertical, mullite, tube furnace heated by four Globar elements. The furnace is maintained at a constant temperature of 2500° F. in the hot zone. The test specimens are suspended from a quartz hook, attached to a wire of platinum-rhodium alloy, which in turn is attached to a flexible chain. The chain goes over an idler pulley, and is affixed to an adjustable crank arm driven by a 1/60 r.p.m. instrument motor and gear-reducer unit. The motor and crank turn one complete revolution in one hour, causing the samples to be slowly lowered into and raised out of the hot zone over this period. The uniformity of the rates of heating and cooling was initially assured by calibrating the unit with the aid of a thermocouple attached near the test samples and feeding the output to a strip-chart recorder. The test is usually continued until there is visual evidence of the initiation of oxidation of the base metal. Duplicate samples are generally employed, and the variation of lifetimes within each pair of duplicates has been sufficiently small to demonstrate that the results are characteristic of the experimental sample batches tested. The test closely simulates the type of temperature profile that a re-entry vehicle, coated with a refractory metal, would encounter in actual use.

Re-entry simulation life test.—This test is carried out in an automatic, programmed, recycling, pressure-temperature-profile simulator. It consists of a Globar-heated, mullite tube furnace and controls, appropriate vacuum seals, vacuum pumping system, automatic traversing mechanism, and programmed pressure-control instrumentation. Temperature variations are obtained by varying the position of the boat containing the sample relative to the hot zone of the furnace. A temperature-controller programmer permits the attainment of a temperature profile of any desired shape. The pressure-control system consists of an absolute pressure transducer, a programmer, a pneumatic-pressure controller, and a diaphragm-driven, needle-bleed valve. The system is capable of controlling pressure in the range of from 0.100 torr to 10 torrs accurately and reproducibly. The specimen temperature is monitored by a sheathed platinum-platinum-rhodium alloy thermocouple, which is inserted through a vacuum seal through a stoking tube, the bead of which is adjacent to and rides with the test specimens as it is stoked in and out of the hot zone of the furnace.

EXAMPLE 3

Coated coupons of D-43 Cb alloy are prepared in essentially the same manner as described in Example 1 using Si-Cr-Fe coating compositions wherein the weight percentages of Cr and Fe are each varied from 20 to 40 in various permutations and the Si constituting the balance. The approximate compositions of the metal coatings and the results of oxidation tests of the fused silicide coated coupons thereby obtained are given in Table III.

base metal consumption during this exposure was equal to approximately 1.1 mils per side.

Similar re-entry tests were conducted at a peak temperature of 2600° F. All of the fused silicide-coated D-43 and Cb-752 columbium alloys exhibited lives in this test in excess of 100 hours (cycles). These specimens were also ductile after exposure up to 2600° F. as evidenced by their ability to withstand a 90° bend test without cracking of the substrate.

EXAMPLE 6

Ten spotwelded lap-joint specimens consisting of two ½ x ½ x 0.010 10-inch thick coupons of D-43 alloy overlapped ¼ inch and joined with a single spotweld were coated with Si-20Cr-20Fe fused silicide in essentially the same manner as in Example 1. The liquid coating composition was applied by spraying, and no effect was made to penetrate the joint with the slurry. The coated joints were fired for 1 hour at 2580° F. under high vacuum.

Figure 4:
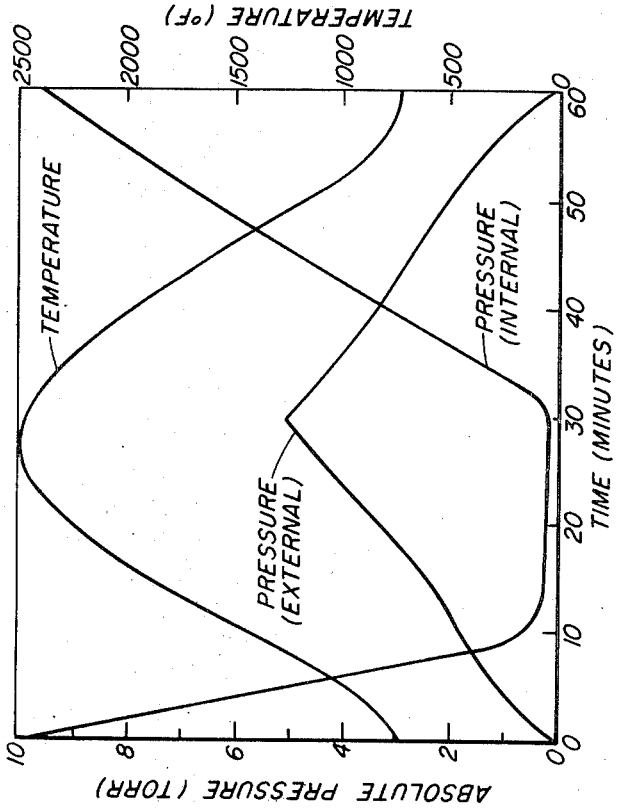
FIG. 4 shows graphs of temperature-pressure programs used in making re-entry simulation tests.

The specimens were tested in the re-entry simulator that previously has been described, using the internal surface profile shown in FIG. 4 and a peak temperature of 2500° F. Two samples were withdrawn after 285 cycles, two more after 332 cycles, while the remaining six were exposed for 500 cycles. There was no evidence of any failure in any of the ten specimens. Photomicrographs of the coated specimens both before and after the re-entry simulation tests show the formation of an ex- TABLE III.—OXIDATION TEST RESULTS OF Si-Cr-Fe FUSED SILICIDE COATINGS ON COLUMBIUM ALLOY D-43

| Composition | 2,580° F. diffusion temp. | | 2,625° F. diffusion temp. | | 2,700° F. diffusion temp. | |
|---|---|---|---|---|---|---|
| | No. 1-hr. Slow cycles to failure | No. 1-hr. 2,400° F. cycles to failure | No. 1-hr. slow cycles to failure | No. 1-hr. 2,400° F. cycles to failure | No. 1-hr. slow cycles to failure | No. 1-hr. 2,400° F. cycles to failure |
| Si-20Cr-20Fe | 84 | 71 | 91 | 71 | 68 | 53 |
| Si-25Cr-25Fe | 84 | 66 | 150 | 66 | 120 | 66 |
| Si-20Cr-30Fe | 120 | 66 | 168 | 66 | 168 | 66 |
| Si-30Cr-20Fe | 100 | 48 | 117 | 48 | 84 | 50-65 |
| Si-20Cr-35Fe | 133 | 50-65 | 73 | 50-65 | 130 | 73 |
| Si-35Cr-20Fe | 112 | 73 | 112 | 73 | 103 | 73 |
| Si-20Cr-40Fe | 58 | 50 | 88 | 50 | 52 | 50 |
| Si-30Cr-30Fe | 118 | 73 | 144 | 73 | 122 | 73 |
| Si-40Cr-20Fe | 138 | 92 | 104 | | 127 | 96 |
| Si-20Cr-10Fe | *41.5 | | | | | |

*Average of duplicate tests.

EXAMPLE 4

Essentially the same procedure is followed as described under Example 1 with the exception that the substrate is a cleaned coupon of sheet elementary columbium. The oxidation resistance of the coated coupon of Cb at high temperature is materially improved.

EXAMPLE 5

Twelve (12) coupons of columbium alloy (D-43) were coated with a Si-20Cr-20Fe fused silicide coating in essentially the same manner as described under Example 1. They were then subjected to the internal-surface profile of the temperature-pressure program for re-entry simulation tests that is shown in FIG. 4. After 553 cycles none of the samples had failed and the test was terminated.

After testing, one specimen was bent 90° and was completely ductile, indicating that no significant contamination of the D-43 alloy had occurred. For comparison, uncoated coupons of unalloyed Cb (i.e., elementary Cb) and D-43 and Cb-752 alloys were cycled through a single profile and similarly bent. The uncoated specimens all fractured when attempts were made to bend them, and were completely embrittled by the single re-entry cycle. A comparison of photomicrographs of the wet-coated and the simulation-tested coated D-43 specimens showed that, although extensive oxidation of the coating in the thermal stress cracks had occurred, none of the cracks extended beyond the inner layer of the coating even after such an extremely long exposure. The tremely close joint with excellent penetration by the fused silicide coating. The complete protectiveness afforded the joint fraying surfaces by the coating is also quite apparent in the photomicrographs. Significantly, the silicide coating forms a smooth fillet, and there is no evidence of any tendency of the sheets to separate in the fillet area during exposure. The strength of the joint also is appreciably enhanced by the brazed joint that is formed by the coating.

Examples previously have been given with reference to the applications or utility of the silicide-coated Cb-metal structures or bodies of this invention. Still another application that is contemplated is in the construction of hypersonic aircraft. These aircraft will operate at very high altitudes so that high-temperature, low-pressure oxidation resistance is required in this application as well as for re-usable re-entry vehicles. Thus, the leading forward edges or components of the foreportion of a hypersonic aircraft advantageously may be constructed at least in part of a coated Cb-metal, more particularly Cb-alloy, structure or article of the present invention.

While there have been shown and described what are at present considered the preferred embodiments of the invention, it will be obvious to those skilled in the art that various changes and modifications may be made therein without departing from the scope of the invention as defined by the appended claims.

We claim:
1. An article of manufacture comprised of a Cb metal selected from the group consisting of Cb and Cb alloys containing at least 45% by weight thereof of Cb, said metal having a surface which is oxidation-resistant at low and high temperatures and which is obtained by fusing in situ, under non-oxidizing conditions, the powdered metal material in a coating applied to the uncoated surface of the said Cb metal, said metal material consisting essentially of Si, Cr, and Fe in the following approximate weight percentages:

| | |
|---|---|
| Si | 40–85 |
| Cr | 10–40 |
| Fe | 5–40 |

2. An article of manufacture as in claim 1 wherein said article is a part of a space re-entry vehicle, and the Cb metal is a Cb alloy containing a major weight percentage of Cb.

3. An article of manufacture as in claim 2 wherein the part of the space re-entry is a nose cone.

4. An article of manufacture as in claim 1 wherein said article is a part of a hypersonic aircraft, and the Cb metal is a Cb alloy containing a major weight percentage of Cb.

5. An article of manufacture as in claim 1 wherein the approximate weight percentages of Si, Cr, and Fe are as follows:

| | |
|---|---|
| Si | 60–85 |
| Cr | 10–30 |
| Fe | 5–30 |

6. An article of manufacture as in claim 1 wherein the approximate weight percentages of Si, Cr, and Fe are 60%, 20% and 20%, respectively.

7. An article of manufacture as in claim 1 wherein the Cb metal is a Cb alloy consisting essentially of, by weight, (a) at least 45% Cb,
(b) from 6 to 50% W,
(c) up to about 15% Zr,
(d) up to about 20% Ti,
(e) up to about 5% Mo,
(f) up to about 5% V,
(g) up to about 5% Fe,
(h) up to about 5% Ni,
(i) up to about 5% Co,
(j) up to about 5% Ta,
(k) up to about 10% Hf,
(l) up to about 1% each of Ba, Y, Be, and the rare-earth metals,
(m) up to 1% carbon,
(n) up to 0.75% oxygen, and
(o) up to 0.5% nitrogen, the sum of the said carbon, oxygen and nitrogen not exceeding 1.5%, and the foregoing weight percentage proportions being subject to the following additional weight percentage limitations:

(1) the Zr is present in a minimum amount of at least 0.25% when the Ti content of the alloy is less than 1%;
(2) the Ti content of the alloy is at least 1% when the Zr content is less than 0.25%;
(3) the sum of the percentages of Mo plus V does not exceed 7%;
(4) the sum of the percentages of Fe, Ni, and Co does not exceed 10%; and
(5) the sum of the percentages of Ta, Hf, Ba, Y, Be, and the rare-earth metals does not exceed 10%.

8. An article of manufacture as in claim 1 wherein the Cb metal is a Cb alloy consisting essentially of, by weight, (a') at least 45% Cb,
(b') from 10 to 40% W,
(c') up to 15% Zr,
(d') up to 17% Ti, the Zr being present in a minimum amount of 0.5% when the Ti content is below 3%, and the Ti being present in a minimum amount of 0.5% when the Zr content is less than 0.5%,
(e') up to 4% Mo,
(f') up to 4% V, the sum of the percentage of Mo and V not exceeding 7%,
(g') up to 5% Ta,
(h') up to 10% Hf,
(i') up to 0.5% of Ba, Y, Be, and the rare-earth metals, the sum of the components of (g'), (h'), and (i') not exceeding 10%,
(j') up to 3% each of Fe, Ni, and Co, the sum of said Fe, Ni, and Co not exceeding 5%,
(k') up to 1% carbon,
(l') up to 0.5% oxygen,
(m') up to 0.3% nitrogen, the sum of said carbon, oxygen and nitrogen not exceeding 1%, and the approximate weight percentages of Si, Cr, and Fe are as follows:

| | |
|---|---|
| Si | 60–85 |
| Cr | 10–30 |
| Fe | 5–30 |

9. An article of manufacture as in claim 1 where the Cb metal is a Cb alloy consisting essentially of, by weight, about 10% W, about 1% Zr, about 0.1% C, and the balance Cb and incidental impurities, and the thickness of the fused coating is from about 1 mil to about 6 mils.

10. An article of manufacture as in claim 1 wherein the columbium metal is a columbium alloy consisting essentially of, by weight, about 10% W, about 2.5% Zr, and the balance Cb and incidental impurities, and the thickness of the fused coating is from about 1 mil to about 6 mils.

11. An article of manufacture as in claim 1 wherein the columbium metal is a columbium alloy consisting essentially of, by weight, about 10% W, about 1% Zr, about 0.1% C, and the balance columbium and incidental impurities; and the approximate weight percentages of Si, Cr and Fe in the metal material in the coating that is applied to the uncoated surface of the said alloy, followed by fusion in situ, are 60%, 20%, and 20%, respectively.

12. An article of manufacture as in claim 11 wherein the thickness of the fused coating is from about 2½ mils to about 4 mils.

13. The method of producing an article consisting of a Cb metal selected from the group consisting of Cb and Cb alloys containing at least 45% by weight thereof of Cb wherein the metal has a surface which is oxidation-resistant at low and high temperatures comprising the steps of:

applying to a clean surface to be protectively coated of the shaped Cb metal a layer of a coating composition comprised of (a) powdered metal material, (b) a fugitive organic binder and (c) a volatile solvent for said binder, said metal material consisting essentially of Si, Cr and Fe in the following approximate weight percentages:

| | |
|---|---|
| Si | 40–85 |
| Cr | 10–40 |
| Fe | 5–40 | drying the applied coating; and
heating the shaped Cb metal with its dried coating thereon under non-oxidizing conditions at a temperature and for a period of time sufficient to fuse the said metal material in situ.

14. The method as in claim 13 wherein the non-oxidizing conditions under which the shaped Cb metal with its dried coating thereon is heated are attained by means which include the use of vacuum.

15. The method as in claim 13 wherein the non-oxidizing conditions under which the shaped Cb metal with its dried coating thereon is heated are attained by means which include providing an atmosphere of an inert gas.

16. The method as in claim 13 wherein the Cb metal is the Cb alloy defined in claim 7; the approximate weight percentage of Si, Cr and Fe are as follows:

| | |
|---|---|
| Si | 60–85 |
| Cr | 10–30 |
| Fe | 5–30 | the coating material consists essentially of the defined powdered metal material dispersed in clear pyroxylin lacquer; the applied coating is dried in air; and the shaped columbium alloy with the dried coating thereon is heated at a pressure of less than $10^{-3}$ torr at a temperature and for a period of time sufficient to fuse the said metal material in situ.

17. The method as in claim 16 wherein the Cb alloy consists essentially of, by weight, about 10% W, about 1% Zr, about 0.1% C, and the balance Cb and incidental impurities; the approximate weight percentages of Si, Cr and Fe are 60%, 20% and 20% respectively; and the shaped Cb alloy with its dried coating thereon is heated at a pressure of less than $10^{-3}$ torr at about 2500° F. for a period of about 1 hour.

References Cited

UNITED STATES PATENTS

| | | | |
|---|---|---|---|
| 2,942,970 | 6/1960 | Goetzel | 117—131 X |
| 3,219,477 | 11/1965 | Grubessich et al. | 75—174 X |
| 3,222,161 | 12/1965 | Luce et al. | |
| 3,314,785 | 4/1967 | Yntema et al. | 75—17 X |
| 3,350,197 | 10/1967 | Beeton et al. | 75—126 X |
| 3,425,116 | 2/1969 | Crooks et al. | 75—174 X |
| 3,432,334 | 3/1969 | Yenawine et al. | 117—131 X |

ALLEN B. CURTIS, Primary Examiner

U.S. Cl. X.R.

29—196; 75—126; 117—131